US012626412B2

(12) United States Patent
Zhang et al.

(10) Patent No.: US 12,626,412 B2
(45) Date of Patent: May 12, 2026

(54) ADAPTIVE GEOMETRY FILTERING FOR MESH COMPRESSION

(71) Applicant: Tencent America LLC, Palo Alto, CA (US)

(72) Inventors: Xiang Zhang, Sunnyvale, CA (US); Xiaozhong Xu, Palo Alto, CA (US); Chao Huang, Palo Alto, CA (US); Jun Tian, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 222 days.

(21) Appl. No.: 18/485,770

(22) Filed: Oct. 12, 2023

(65) Prior Publication Data

US 2024/0135594 A1 Apr. 25, 2024

Related U.S. Application Data

(60) Provisional application No. 63/416,382, filed on Oct. 14, 2022.

(51) Int. Cl.
*G06T 9/00* (2006.01)
(52) U.S. Cl.
CPC .................................... *G06T 9/001* (2013.01)
(58) Field of Classification Search
None
See application file for complete search history.

(56) References Cited

U.S. PATENT DOCUMENTS

| 2018/0253867 | A1* | 9/2018 | Laroche ................. G06T 17/20 |
| 2020/0286261 | A1 | 9/2020 | Faramarzi et al. |
| 2020/0351484 | A1* | 11/2020 | Aflaki ...................... G06T 7/41 |
| 2021/0090301 | A1 | 3/2021 | Mammou et al. |
| 2021/0099701 | A1 | 4/2021 | Tourapis et al. |
| 2021/0217203 | A1 | 7/2021 | Kim et al. |
| 2022/0164994 | A1* | 5/2022 | Joshi ...................... G06T 9/001 |

FOREIGN PATENT DOCUMENTS

| JP | 2004-537887 A | 12/2004 |
| JP | 2017-184262 A | 10/2017 |
| JP | 2020-017986 A | 1/2020 |

OTHER PUBLICATIONS

International Search Report dated Jan. 11, 2024 in International Application No. PCT/US23/35090.
Written Opinion dated Jan. 11, 2024 in International Application No. PCT/US23/35090.

(Continued)

*Primary Examiner* — James A Thompson
(74) *Attorney, Agent, or Firm* — Sughrue Mion, PLLC

(57) ABSTRACT

A method and apparatus comprising computer code configured to cause a processor or processors to determine more than one vertices in an input mesh, and group the more than one vertices in more than one group of vertices. The grouping of a respective vertex in a respective group may be based on a topological distance of the respective vertex. In embodiments, the processor or processors may also determine a set of filter coefficients for the more than one group of vertices; and signal the more than one group of vertices and the set of filter coefficients.

18 Claims, 8 Drawing Sheets

(56)              References Cited

OTHER PUBLICATIONS

EP Search Report issued Dec. 12, 2025 in EP Application No. 23878017.5.

Zhang et al., "[V-CG] Tencent's Dynamic Mesh Coding Cfp Response", International Organisation for Standardisation, ISO/IEC JTC 1/SC 29/WG 7 m59295, Online—Apr. 2022, XP030330544, 16 pages.

Graziosi et al., "[V-PCC] [EE2.6-related] Mesh Geometry Smoothing Filter", International Organisation for Standardisation,ISO/IEC JTC 1/SC 29/WG 7 m 55374, Online—Oct. 2020, 6 pages.

* cited by examiner

Figure 5:
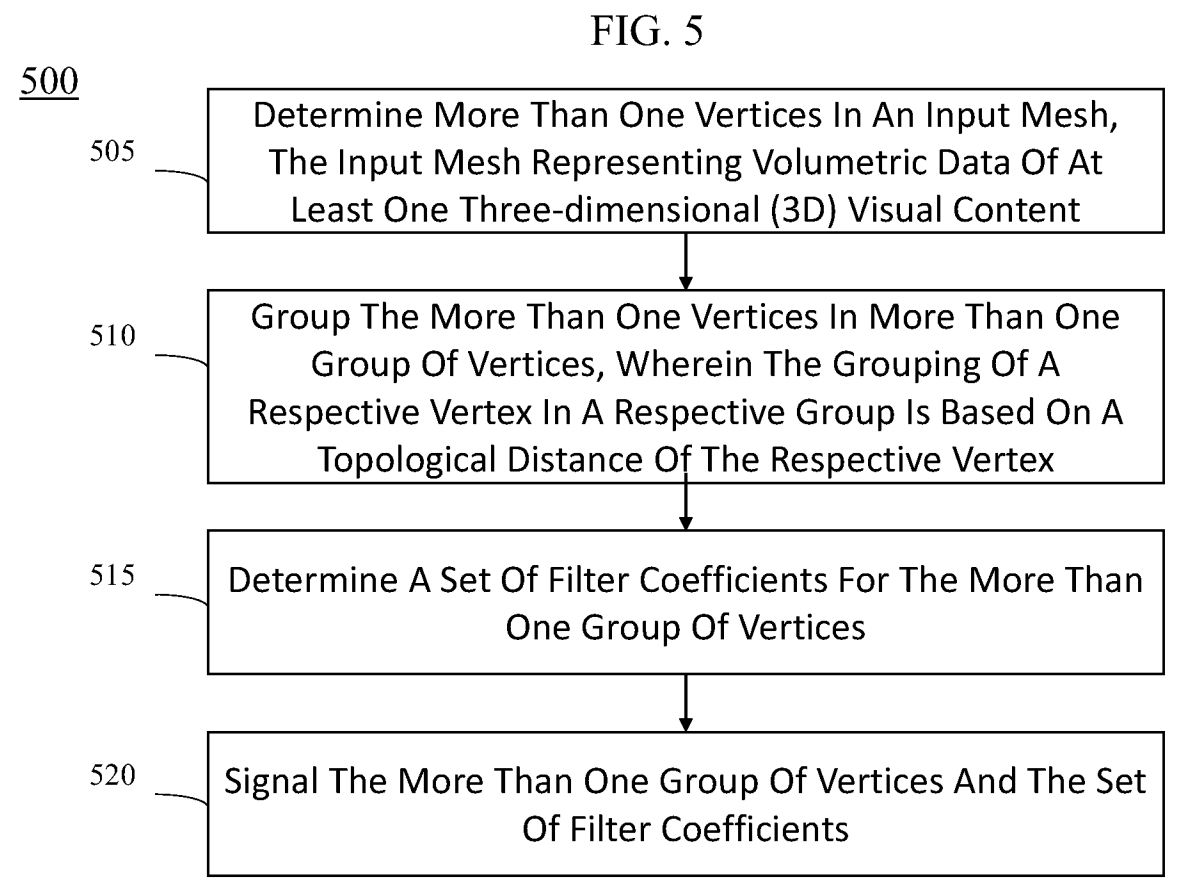

505 — Determine More Than One Vertices In An Input Mesh, The Input Mesh Representing Volumetric Data Of At Least One Three-dimensional (3D) Visual Content 510 — Group The More Than One Vertices In More Than One Group Of Vertices, Wherein The Grouping Of A Respective Vertex In A Respective Group Is Based On A Topological Distance Of The Respective Vertex 515 — Determine A Set Of Filter Coefficients For The More Than One Group Of Vertices 520 — Signal The More Than One Group Of Vertices And The Set Of Filter Coefficients

FIG. 6

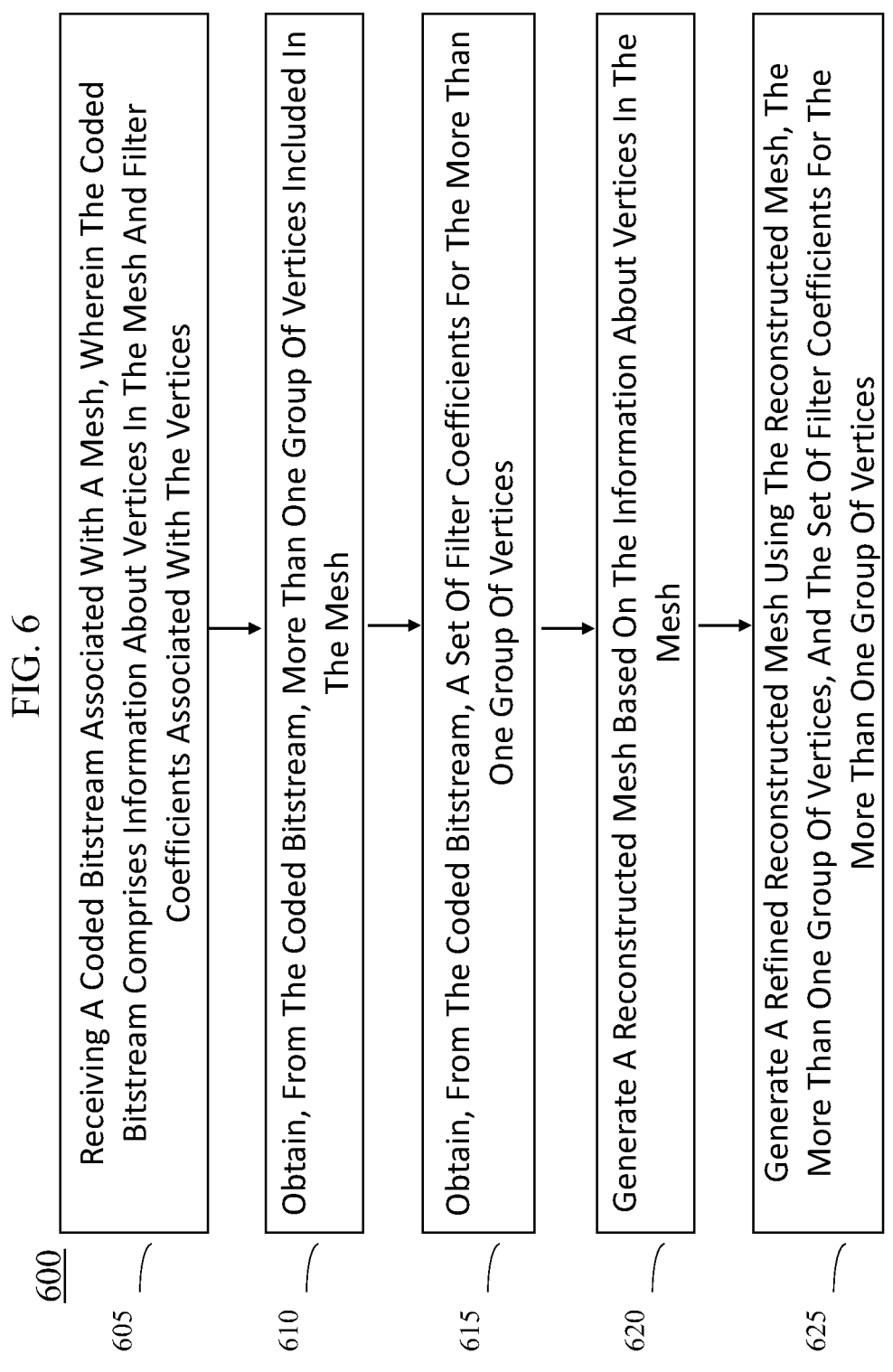

600

605 — Receiving A Coded Bitstream Associated With A Mesh, Wherein The Coded Bitstream Comprises Information About Vertices In The Mesh And Filter Coefficients Associated With The Vertices 610 — Obtain, From The Coded Bitstream, More Than One Group Of Vertices Included In The Mesh 615 — Obtain, From The Coded Bitstream, A Set Of Filter Coefficients For The More Than One Group Of Vertices 620 — Generate A Reconstructed Mesh Based On The Information About Vertices In The Mesh 625 — Generate A Refined Reconstructed Mesh Using The Reconstructed Mesh, The More Than One Group Of Vertices, And The Set Of Filter Coefficients For The More Than One Group Of Vertices

ADAPTIVE GEOMETRY FILTERING FOR MESH COMPRESSION

CROSS REFERENCE TO RELATED APPLICATION

The present application claims priority to U.S. Provisional Application No. 63/416,382 filed on Oct. 14, 2022, the disclosure of which is incorporated herein in its entirety.

FIELD

Embodiments of this disclosure are directed to video coding and decoding. Specifically, embodiments of the present disclosure are to encoding and decoding meshes including adaptive geometry filtering in mesh motion vector coding.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may include several polygons that describe the surface of a volumetric object. A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

As another example, glTF (GL Transmission Format) is standard being developed from the Khronos Group for the efficient transmission and loading of 3D scenes and models by applications. glTF aims to minimize both the size of 3D assets, and the runtime processing needed to unpack. A geometry compression extension to glTF 2.0 using Google Draco technology is being developed to reduce the size of glTF models and scenes.

SUMMARY

According to an embodiment, a method and apparatus comprising computer code configured to cause a processor or processors to determine more than one vertices in an input mesh, the input mesh representing volumetric data of at least one three-dimensional (3D) visual content; group the more than one vertices in more than one group of vertices, wherein the grouping of a respective vertex in a respective group is based on a topological distance of the respective vertex; determine a set of filtering coefficients for the more than one group of vertices; and signal the more than one group of vertices and the set of filtering coefficients.

According to an embodiment, a method and apparatus comprising computer code configured to cause a processor or processors to receive a coded bitstream associated with a mesh, wherein the coded bitstream comprises information about vertices in the mesh and filtering coefficients associated with the vertices; obtain, from the coded bitstream, more than one group of vertices included in the mesh; obtain, from the coded bitstream, a set of filtering coefficients for the more than one group of vertices; generate a reconstructed mesh based on the information about vertices in the mesh; and generate a refined reconstructed mesh using the reconstructed mesh, the more than one group of vertices, and the set of filtering coefficients for the more than one group of vertices.

BRIEF DESCRIPTION OF THE DRAWINGS

Further features, nature, and various advantages of the disclosed subject matter will be more apparent from the following detailed description and the accompanying drawings in which:

FIG. 5 is a flowchart of a process for encoding adaptive filtering coefficients, in accordance with embodiments of the present disclosure.

FIG. 6 is a flowchart of a process for generating a reconstructed mesh using signaled adaptive filtering coefficients, in accordance with embodiments of the present disclosure.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
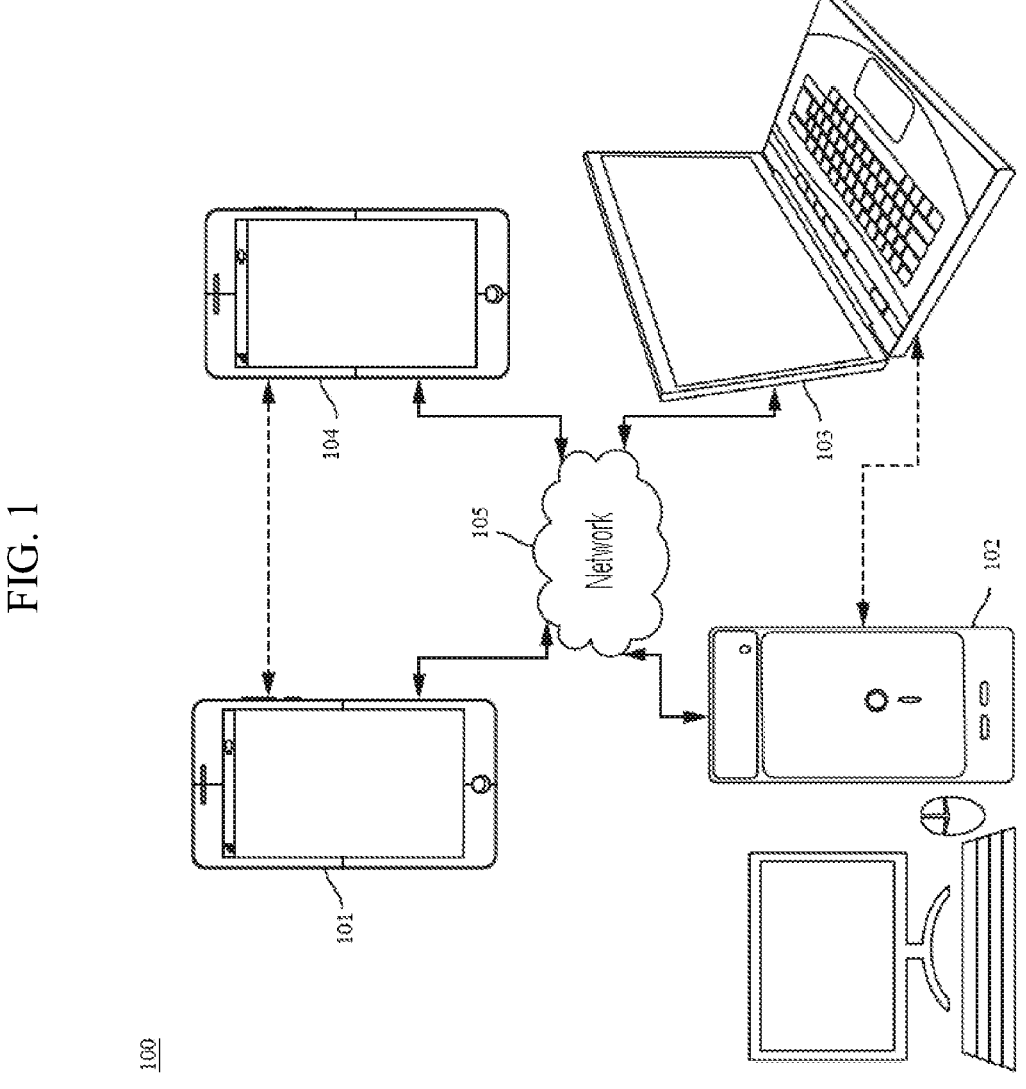
FIG. 1 is a schematic illustration of a simplified block diagram of a communication system, in accordance with embodiments of the present disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during video conferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
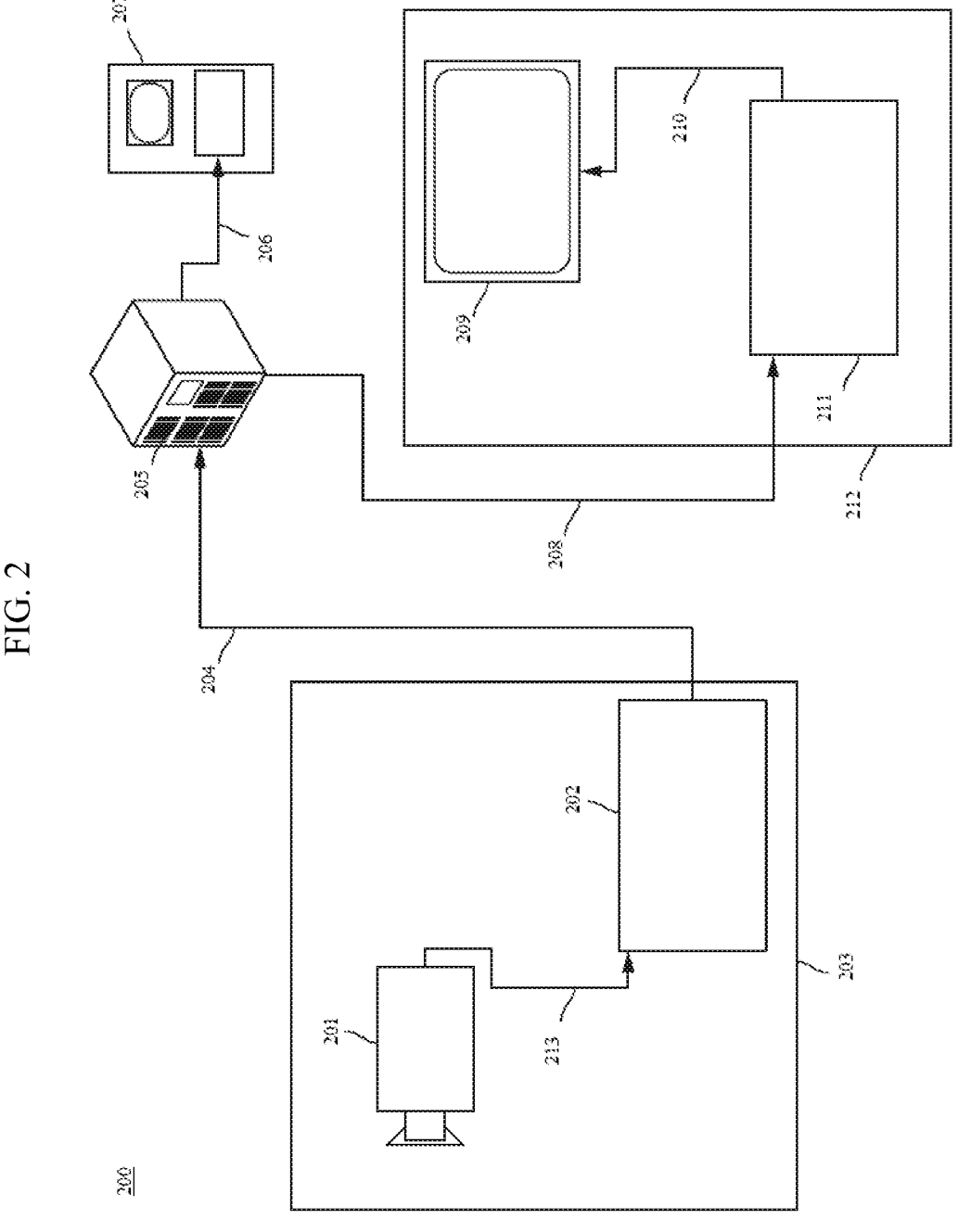
FIG. 2 is a schematic illustration of a simplified block diagram of a streaming system, in accordance with embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

According to exemplary embodiments further described below, the term "mesh" indicates a composition of one or more polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping may be described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading according to exemplary embodiments.

Nonetheless, a dynamic mesh sequence may require a large amount of data since it may consist of a significant amount of information changing over time. For example, in contrast to a "static mesh", or "static mesh sequence," in which information of that mesh may not change from one frame to another, a "dynamic mesh", or a "dynamic mesh sequence", indicates motion in which ones of vertices represented by that mesh change from one frame to another. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. According to exemplary embodiments herein, there is described aspects of a new mesh compression standards to directly handle dynamic meshes with time varying connectivity information and optionally time varying attribute maps, this standard targets lossy, and lossless compression for various applications, such as real-time communications, storage, free viewpoint video, AR and VR. Functionalities such as random access and scalable/progressive coding are also considered.

Figure 3:
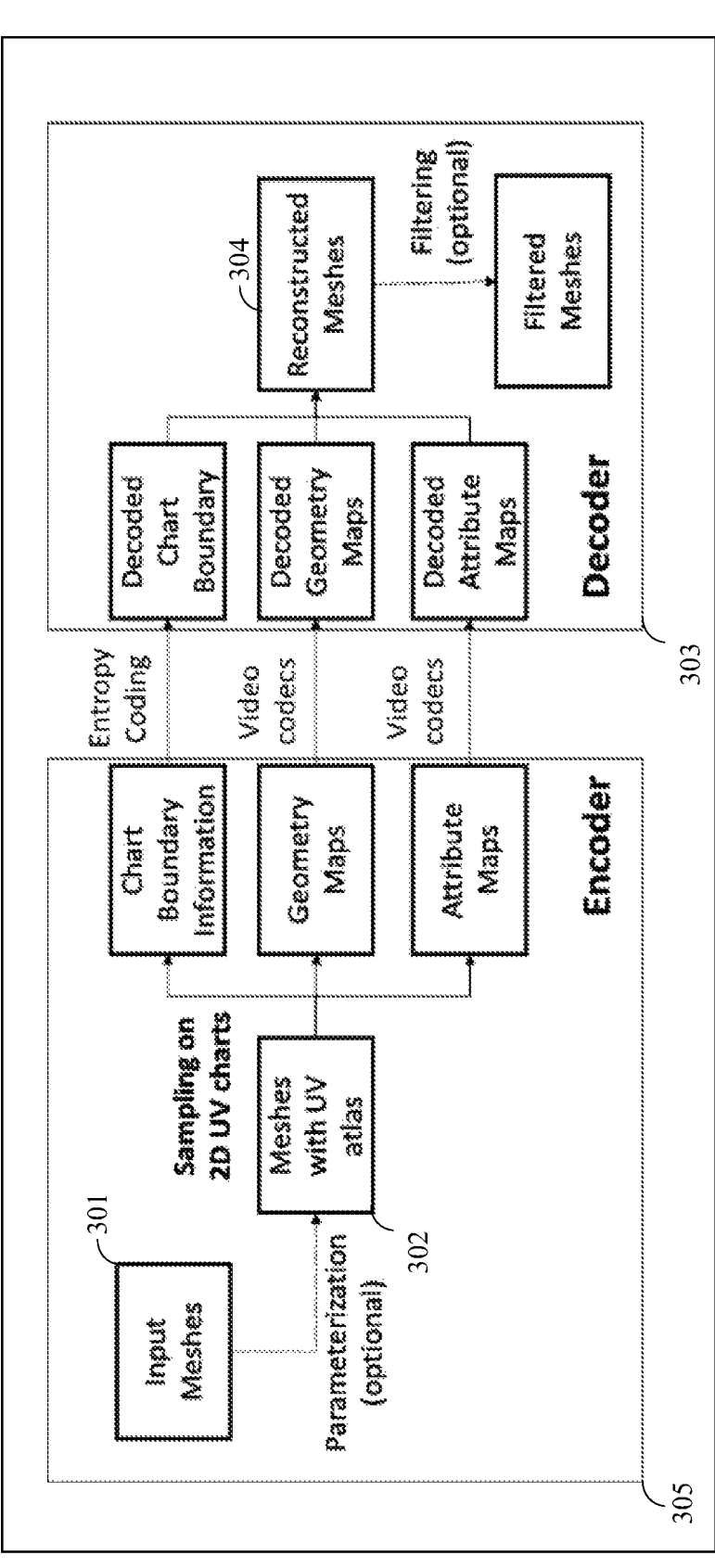
FIG. 3 is a schematic illustration of a simplified block diagram of a video encoder and decoder, in accordance with embodiments of the present disclosure.

FIG. 3 represents an example framework 300 of one dynamic mesh compression such as for a 2D atlas sampling based method. Each frame of the input meshes 301 can be preprocessed by a series of operations, e.g., tracking, remeshing, parameterization, voxelization. Note that, these operations can be encoder-only, meaning they might not be part of the decoding process and such possibility may be signaled in metadata by a flag such as indicating 0 for encoder only and 1 for other. After that, one can get the meshes with 2D UV atlases 302, where each vertex of the mesh has one or more associated UV coordinates on the 2D atlas. Then, the meshes can be converted to multiple maps, including the geometry maps and attribute maps, by sampling on the 2D atlas. Then these 2D maps can be coded by video/image codecs, such as HEVC, VVC, AV1, AVS3, etc. On the decoder 303 side, the meshes can be reconstructed from the decoded 2D maps. Any post-processing and filtering can also be applied on the reconstructed meshes 304. Note that other metadata might be signaled to the decoder side for the purpose of 3D mesh reconstruction. Note that the chart boundary information, including the uv and xyz coordinates, of the boundary vertices can be predicted, quantized and entropy coded in the bitstream. The quantization step size can be configured in the encoder side to tradeoff between the quality and the bitrates.

In some implementations, a 3D mesh can be partitioned into several segments (or patches/charts), one or more 3D mesh segments may be considered to be a "3D mesh" according to exemplary embodiments. Each segment is composed of a set of connected vertices associated with their geometry, attribute, and connectivity information. As illustrated in the example 400 of volumetric data in FIG. 4A, the UV parameterization process 402 of mapping from 3D mesh segments onto 2D charts, such as to the above noted 2D UV atlases 302 block, maps one or more mesh segments 401 onto a 2D chart 403 in the 2D UV atlas 404. Each vertex ($v_n$) in the mesh segment my be assigned with a 2D UV coordinates in the 2D UV atlas. Note that the vertices ($v_n$) in a 2D chart form a connected component as their 3D counterpart. The geometry, attribute, and connectivity information of each vertex can be inherited from their 3D counterpart as well. For example, information may be indicated that vertex $v_4$ connects directly to vertices $v_0$, $v_5$, $v_1$, and $v_3$, and similarly information of each of the other vertices may also be likewise indicated. Further, such 2D texture mesh would, according to exemplary embodiments, further indicate information, such as color information, in a patch-by-patch basis such as by patches of each triangle, e.g., $v_2$, $v_5$, $v_3$ as one "patch".

Figure 4A:
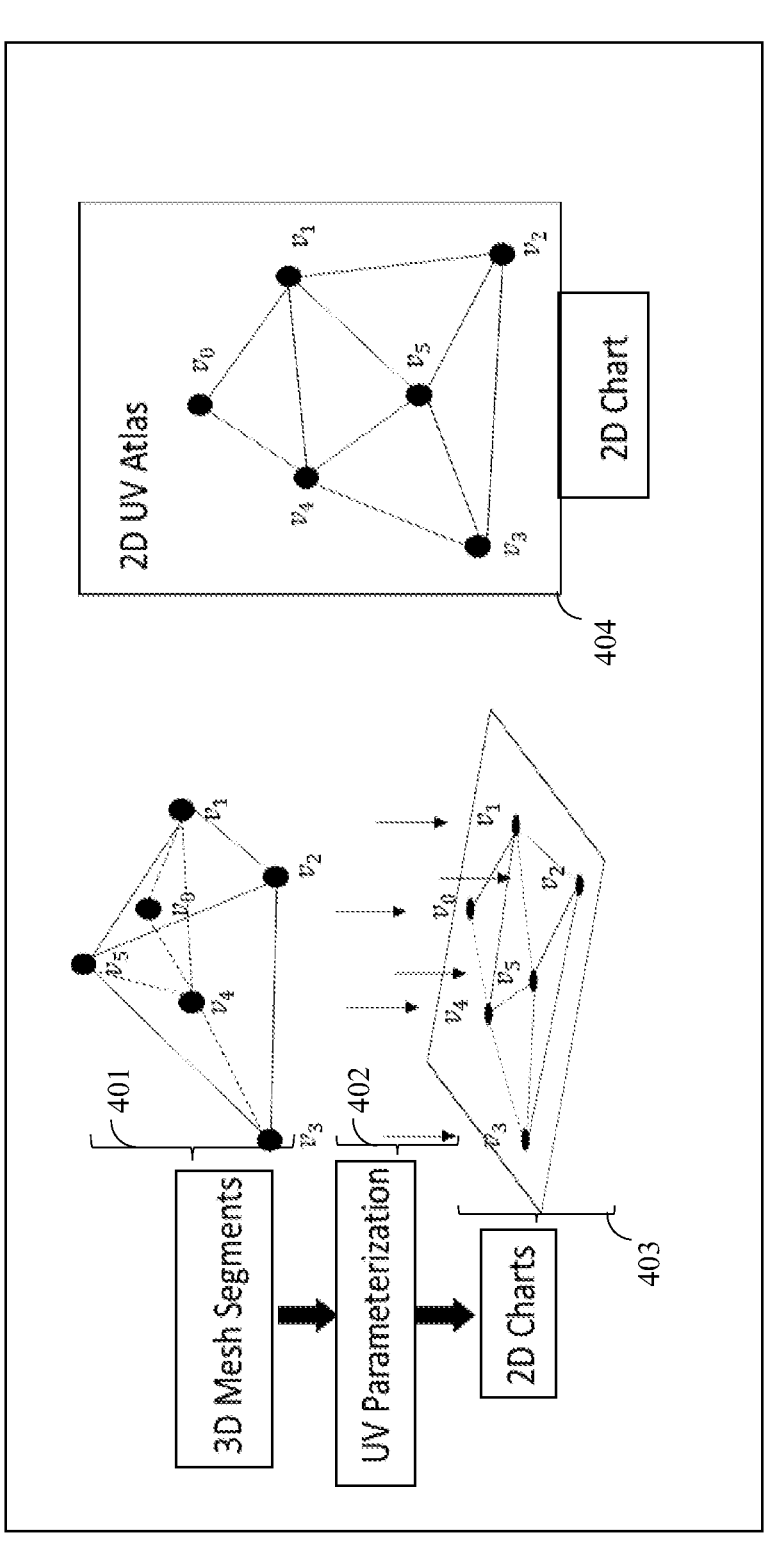
FIGS. 4A-B are exemplary illustrations of UV parameterization mapping from 3D mesh segments onto 2D charts, in accordance with embodiments of the present disclosure.
Figure 4B:
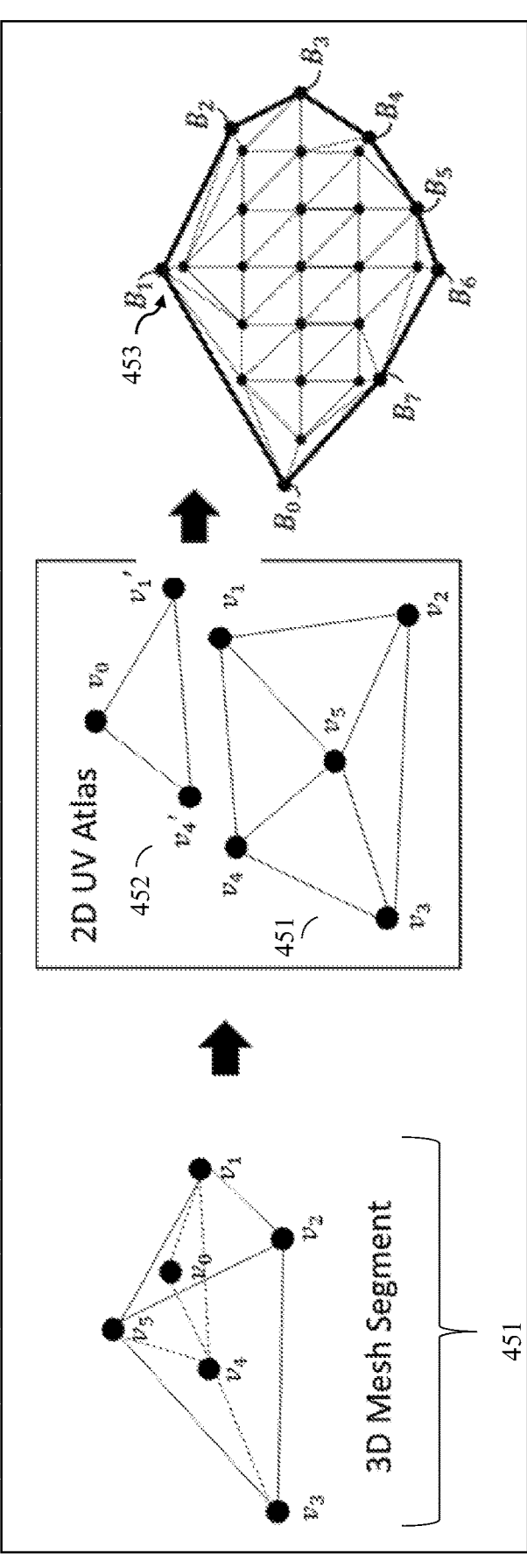

For example, further to the features of the example 400 of FIG. 4A, see the example 450 of FIG. 4B where the 3D mesh segment 451 can be also mapped to multiple separate 2D charts 451 and 452. In this case, a vertex in 3D could corresponds to multiple vertices in 2D UV atlas. As shown in FIG. 4B, the same 3D mesh segment is mapped to multiple 2D charts, instead of a single chart as in FIG. 4A, in the 2D UV atlas. For example, 3D vertices $v_1$ and $v_4$ each have two 2D correspondences $v_1$, $v_{1'}$, and $v_4$, $v_{4'}$, respectively. As such, a general 2D UV atlas of a 3D mesh may consist of multiple charts, where each chart may contain multiple (usually more than or equal to 3) vertices associated with their 3D geometry, attribute, and connectivity information.

FIG. 4B shows an example 453 illustrating a derived triangulation in a chart with boundary vertices $B_0$, $B_1$, $B_2$, $B_3$, $B_4$, $B_5$, $B_6$, $B_7$. When presented with such information, any triangulation method can be applied to create connectivity among the vertices (including boundary vertices and sampled vertices). For example, for each vertex, find the closest two vertices. Or for all vertices, continuously generate triangles until a minimum number of triangles is achieved after a set number of tries. As shown in the example 453, there are various regularly shaped, repeating triangles and various oddly shaped triangles, generally closest to the boundary vertices, having their own unique dimensions that may or may not be shared with any other of the triangles. The connectivity information can be also reconstructed by explicit signaling. If a polygon cannot be recovered by implicit rules, the encoder can signal the connectivity information in the bitstream according to exemplary embodiments.

Boundary vertices $B_0$, $B_1$, $B_2$, $B_3$, $B_4$, $B_5$, $B_6$, $B_7$ are defined in the 2D UV space. A boundary edge can be determined by checking if the edge is only appeared in one triangle. The following information of boundary vertices is significant and should be signaled in the bitstream according to exemplary embodiments: geometry information, e.g., the 3D XYZ coordinates even though currently in the 2D UV parametric form, and the 2D UV coordinates.

For a case in which a boundary vertex in 3D corresponds to multiple vertices in 2D UV atlas, such as shown in FIG. 4B, the mapping from 3D XUZ to 2D UV can be one-to-multiple. Therefore, a UV-to-XYZ (or referred to as UV2XYZ) index can be signaled to indicate the mapping function. UV2XYZ may be a 1D-array of indices that correspond each 2D UV vertex to a 3D XYZ vertex.

As stated above, a dynamic mesh sequence may require a large amount of data since it may consist of a significant amount of information changing over time. The sampling-based method used in related art may introduce some artifacts on the reconstructed mesh geometry, which may degrade the visual quality. Therefore, there is a need to develop efficient algorithms to reduce such artifacts and improve the quality of the reconstructed mesh.

Embodiments of the present disclosure may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Embodiments of the present disclose relate to a number of methods for filtering of the reconstructed geometry in mesh compression. A person of skill in the art may know that the methods as disclosed herein may be applied individually or by any form of combinations. It should be also noted that the methods may be applied to static meshes, where there is only one frame of the mesh, or the mesh content does not change over time.

An advantage of adaptive geometry filtering as disclosed herein is to improve the quality of the reconstructed mesh, by signaling sets of filtering coefficients. The filtering coefficients may be trained on encoder-side based on the reconstructed mesh and the corresponding reference mesh, where each set of filtering coefficients may be trained on a group of similar vertices. The filtering coefficients may then be applied to each vertex and its neighboring vertices.

More specifically, according to embodiments, let $V^{rec}$ denote the vertices of the reconstructed mesh, and $V^{ref}$ as the vertices of the corresponding reference mesh. Note that the reconstructed and reference meshes have the same number of vertices (N) and the same topology, vertices in $V^{rec}$ and $V^{ref}$ have one-to-one correspondence. The reference mesh may be the original mesh or a deformed mesh from original mesh depending on the encoder configurations. The adaptive geometry filtering, according to embodiments of the present disclosure, may be applied on the encoder-side as follows:

As an initial step, the vertices may be classified into groups.

Let $V_{i,j}^{rec}$ be the $j^{th}$ vertices in the $i^{th}$ group of the reconstructed mesh, where $j=1, 2, \ldots, G_i$, $i=1, 2, \ldots, N_G$. $N_G$ is the number of groups, and $G_i$ is the number of vertices in $i^{th}$ group. Similarly, let $V_{i,j}^{ref}$ be the $j^{th}$ vertices in the $i^{th}$ group of the corresponding reference mesh.

In the same or next step, the $i^{th}$ group of vertices, a set of filter coefficients ($c_i$) may be calculated based on the vertices in the group and their neighboring vertices by minimizing some defined error functions.

In the next or same step, for the $i^{th}$ group of vertices, the calculated filter coefficients ($c_i$) may be quantized, optimized and encoded in the bitstream, and dequantized by the decoder.

Let $\hat{c}_i$ be the corresponding dequantized filter coefficients. Then, for the $i^{th}$ group of vertices, each vertex is updated given the dequantized coefficients ($\hat{c}_i$).

Therefore, according to an embodiment, adaptive geometry filtering may include determining more than one vertices in an input mesh and grouping the more than one vertices in more than one group of vertices. Then, a set of filtering coefficients for the more than one group of vertices may be determined. Then, the more than one group of vertices and the set of filtering coefficients may be encoded and signaled. In some embodiments they may be encoded in a same bitstream. In some embodiments, the set of filtering coefficients may be encoded and signaled as metadata.

The adaptive geometry filtering, according to embodiments of the present disclosure, may be applied on the encoder-side as follows:

The vertices may be classified into groups using the exact same method as the encoder. In some embodiments, the method of grouping is agreed upon by the encoder and the decoder. In some embodiments the agreed upon method may include grouping of a respective vertex in a respective group based on a topological distance of the respective vertex.

Then, for the $i^{th}$ group of vertices, the filter coefficients may be decoded from the bitstream and dequantized in the same way as encoder.

In a same of different step, for the $i^{th}$ group of vertices, each vertex may be updated given the dequantized coefficients $(\hat{c}_i)$ as the encoder. Note that the same methods proposed in this disclosure can be applied to 3D point clouds, where the vertex of the mesh corresponds to points in point cloud. The same methods can be also applied to other attributes of meshes (and point clouds), e.g., colors, normal, etc.

Therefore, according to an embodiment, adaptive geometry filtering as applied at the decoder may include receiving a coded bitstream associated with a mesh, wherein the coded bitstream comprises information about vertices in the mesh and filtering coefficients associated with the vertices, and obtaining more than one group of vertices included in the mesh and a set of filtering coefficients for the more than one group of vertices from the coded bitstream. Then, a reconstructed mesh may be constructed based on the information about vertices in the mesh, which may be refined using the more than one group of vertices and the set of filtering coefficients for the more than one group of vertices.

Vertex Grouping

Vertex grouping may classify the vertices of the reconstructed mesh into groups based on various characteristics, as long as the same process can be done on decoder-side.

In one embodiment, the vertices may be grouped into regions based on the topology of the reconstructed mesh, where each group of vertices has roughly the same number of vertices that are connected through edges. In some embodiments, a topological distance that measures the structural distance between two graphs or points in a metric space may be used for grouping, e.g., a number of edges between two points, or Euclidean distance.

In a same or another embodiment, the vertices may be grouped based on various characteristics that can be derived from the reconstructed mesh. These characteristics may include but are not limited to the following: the curvature of the vertex, the vertex normal direction, the level of details layer of the vertex, etc.

Vertex Neighboring

According to an embodiment, for each vertex $V_{i,j}^{rec}$, there may different ways to define its neighbors. The criterial of defining neighbors can include but are not limited to the topological distance, Euclidean distance etc.

As an example, in one embodiment, only the vertices directly connected to $V_{i,j}^{rec}$ are considered as neighbors. In other words, the topological distance between $V_{i,j}^{rec}$ and its neighbors is 1. As an example, in a same or another embodiment, all the connected vertices of $V_{i,j}^{rec}$ whose topological distance is smaller than a threshold can be considered as neighbors of $V_{i,j}^{rec}$. As an example, in a same or another embodiment, all the vertices whose Euclidean distance to $V_{i,j}^{rec}$ is smaller than a threshold can be considered as neighbors of $V_{i,j}^{rec}$.

In some embodiments, the neighbors of $V_{i,j}^{rec}$ may be then reordered by its Euclidean distance to $V_{i,j}^{rec}$ in ascending order. Note that the neighbors of $V_{i,j}^{rec}$ and $V_{i,j}^{rec}$ are not necessarily belonging to the same group.

Filters and Coefficient Derivation

Assume that the reordered neighbors of $V_{i,j}^{rec}$ as $\{V_{i,j,k}^{rec}\}$, where k=1, 2, . . . , T−1, i.e., $V_{i,j,k}^{rec}$ is the $k^{th}$ neighbor of $V_{i,j}^{rec}$, and T−1 is the number of neighbors. In some embodiments, and used only as an example herein, $V_{i,j,k}^{rec}=V_{i,j}^{rec}$ when k=0 in the following equations.

According to embodiments, A plurality of different ways may be used to define the filter coefficients and the error function to be minimized.

Adaptive Laplacian Filter with Point-to-Point Loss Function

In one embodiment, the Adaptive Laplacian Filter may be applied with a single coefficient $(c_i)$ for the $i^{th}$ group of vertices as follows, $$V_{i,j}^{filtered} = V_{i,j}^{rec} + c_i \cdot \left\{ \frac{1}{T-1}\left(\sum_{k=1}^{T-1} V_{i,j,k}^{rec}\right) - V_{i,j}^{rec} \right\} \tag{1}$$

where $$V_{i,j}^{filtered}$$

indicates the updated vertex from $$V_{i,j}^{rec}.$$

On the encoder-side, the coefficient $c_i$ can be derived by minimizing the following point-to-point error functions:

$$c_i = \operatorname*{argmin}_{c_i} \sum_{j=1}^{G_i} \left\| V_{i,j}^{filtered} - V_{i,j}^{ref} \right\|_2^2 = \tag{2}$$

$$\operatorname*{argmin}_{c_i} \sum_{j=1}^{G_i} \left\| V_{i,j}^{rec} + c_i \cdot \left\{ \frac{1}{T-1}\left(\sum_{k=1}^{T-1} V_{i,j,k}^{rec}\right) - V_{i,j}^{rec} \right\} - V_{i,j}^{ref} \right\|_2^2$$

which may be solved by an appropriate method, e.g., least squares method.

Adaptive Laplacian Filter with Point-to-Plane Loss Function

In a same or another embodiment, the same Adaptive Laplacian Filter can be applied as the last embodiment, but the filter coefficients are optimized with the minimum point-to-plane error function, $$c_i = \operatorname*{argmin}_{c_i} \sum_{j=1}^{G_i} \overline{V}_{i,j}^{filtered^T} \cdot Q_{i,j}^{ref} \cdot \overline{V}_{i,j}^{filtered} \tag{3}$$

where $$Q_{i,j}^{ref}$$

is the 4×4 quadrics matrix derived from the $j^{th}$ vertices in the $i^{th}$ group of the reference mesh, and $$V_{i,j}^{filtered}$$

the homogeneous vector of $V_{i,j}^{filtered}$ with an extended dimension of the value of 1. Minimizing the loss function can be also solved by least square methods.

Adaptive Wiener Filter with Point-to-Point Loss Function

In a same or another embodiment, Adaptive Wiener Filter can be applied as follows, $$V_{i,j}^{filtered} = \sum_{k=0}^{T-1} c_{i,k} \cdot V_{i,j,k}^{rec} \qquad (4)$$

Note that for each group of vertices, the derived filter coefficients ($c_i$) will have the length of T, and they can be derived by minimizing the following point-to-point error function, $$c_i = \qquad (5)$$

$$\underset{c_i}{\text{argmin}} \sum_{j=1}^{G_i} \left\| V_{i,j}^{filtered} - V_{i,j}^{ref} \right\|_2^2 = \underset{c_i}{\text{argmin}} \sum_{j=1}^{G_i} \left\| \sum_{k=0}^{T-1} c_{i,k} \cdot V_{i,j,k}^{rec} - V_{i,j}^{ref} \right\|_2^2$$

which can be also solved by any appropriate method, e.g., the least square method.

Adaptive Wiener Filter with Point-to-Plane Loss Function

In a same or another embodiment, the same Adaptive Wiener Filter may be applied as the last embodiment, but the filter coefficients may be optimized with the minimum point-to-plane error function, $$c_i = \underset{c_i}{\text{argmin}} \sum_{j=1}^{G_i} \bar{V}_{i,j}^{filtered^T} \cdot Q_{i,j}^{ref} \cdot \bar{V}_{i,j}^{filtered} \qquad (6)$$

where $$Q_{i,j}^{ref}$$

is the 4×4 quadrics matrix derived from the $j^{th}$ vertices in the $i^{th}$ group of the reference mesh, and $$\bar{V}_{i,j}^{filtered}$$

the homogeneous vector of $$V_{i,j}^{filtered}$$

with an extended dimension of the value of 1. Minimizing the loss function may be also solved by any appropriate method, e.g., the least square methods.

Therefore, as disclosed herein, the encoder may use any combination of filter function and a loss function. In embodiments, the encoder and decoder may agree on which filter function and which loss function to use. In embodiments, the encoder may signal a flag indicating whether every group uses a same filter function, a same loss function, different filter functions, or different loss functions. If different filter or loss functions may be used by groups, the encoder may signal additional flags or information indicating a filter function and/or a loss function for every group. In some embodiments, this signaling completely precedes signaling the groups of vertices, but in some embodiments, this signaling precedes respective groups of vertices.

Filter Coefficient Optimization

The filter coefficients may be fine-tuned before encoding based on the estimated rate-distortion performance. The distortion term (D) may be estimated by either the point-to-point or the point-to-plane loss function as described herein. The rate term (R) can be estimated from the distribution of the coefficients.

In one embodiment, the filter may be disabled for the $i^{th}$ group of vertices if the distortion term is larger than a threshold, where the threshold can be a function of the quantization step size of the filter coefficients.

In a same or another embodiment, the filter may be disabled for the $i^{th}$ group of vertices if the D+λ·R is larger than a threshold, where λ is the tradeoff parameter which can be a function of the quantization step size of the filter coefficients.

Filter Coefficient Coding

The quantized and optimized filter coefficients may then be entropy coded in the bitstream in different ways.

In one embodiment, one binary flag is first coded to indicate whether the filter is applied to the $i^{th}$ group. If the flag is true, then the coefficients are coded; Otherwise, the coefficients are not coded. This binary flag can be coded with or without contexts in arithmetic coding.

For each coefficient value, it can be coded by fixed-length coding or Exp-Golomb coding, etc.

In one embodiment, the coefficient value can be coded as follows. One binary flag is coded to indicate whether the value equals to 0. If this flag is false, then another binary flag is coded to indicate whether the value equals to 1. If this flag is also false, then the value minus 2 is coded by Exp-Golomb coding.

In some embodiments, some of the coefficients can be predicted from other coefficients before encoding. For example, if the Adaptive Wiener Filter is applied, the first coefficient can be predicted from the other coefficients.

FIG. 5 is a flowchart for a process 500 illustrating mesh compression, in accordance with embodiments of the present disclosure.

At operation 505, more than one vertices in an input mesh may be determined. The input mesh may represent volumetric data of at least one three-dimensional (3D) visual content.

At operation 510, the more than one vertices may be grouped in more than one group of vertices. In embodiments, the grouping of a respective vertex in a respective group may be based on a topological distance of the respective vertex.

In embodiments, the grouping the respective vertex based on the topological distance may include determining neighboring vertices for the respective vertex, wherein neighboring vertices are vertices connected to the respective vertex by at least one edge; and grouping the respective vertex in a first group such that vertices in the first group are connected to a same number of vertices through edges.

In embodiments, determining the neighboring vertices of the respective vertex may include one or more of determining the neighboring vertices that are directly connected to the respective edge in the input mesh; or determining the neighboring vertices that are connected to the respective vertex a plurality of edges, the plurality of edges being less than or equal to a first threshold.

At operation 515, a set of filtering coefficients may be determined for the more than one group of vertices.

In embodiments, determining the set of filtering coefficients may include determining the set of filtering coefficients based on a first loss function and a first filter function, wherein the set of filtering coefficients comprises one or more filter coefficients for each group among the more than one group of vertices.

In embodiments, the first loss function may include one of a point-to-point loss function, or point-to-plane loss function. In the same or different embodiments, the first filter function may include one of a Laplacian filter or a Weiner filter.

In some embodiments, wherein subsequent to determining the set of filter coefficients, process 500 may include disabling a first filter coefficient for a first group among the more than one group of vertices based on the first filter coefficient having a distortion higher than a distortion threshold.

At operation 520, the more than one group of vertices and the set of filtering coefficients may be signaled.

In some embodiments, operation 520 may include signaling a binary flag for each group among the more than one group of vertices that indicates whether a filter coefficient for the respective group is enabled; and based on the binary flag for the respective group indicating that the filter coefficient is enabled, signaling one or more coefficients associated with the respective group. Operation 520 may also include signaling a second flag that indicates whether a same first filter function is used to determine the set of filter coefficients for each group in the more than one group of vertices. In some embodiments, operation 520 may also include signaling a third flag that indicates whether a same first loss function is used to determine the set of filter coefficients for each group in the more than one group of vertices.

FIG. 6 is a flowchart for a process 600 illustrating mesh reconstruction, in accordance with embodiments of the present disclosure.

At operation 605, a coded bitstream associated with a mesh may be received. The coded bitstream may include information about vertices in the mesh and filtering coefficients associated with the vertices. At operation 610, more than one group of vertices included in the mesh may be obtained from the coded bitstream. At operation 615, a set of filtering coefficients for the more than one group of vertices may be obtained from the coded bitstream. At operation 620, a reconstructed mesh may be generated based on the information about vertices in the mesh. In embodiments, the reconstructed mesh may be further refined and a refined reconstructed mesh may be constructed at operation 625 using the reconstructed mesh, the more than one group of vertices, and the set of filtering coefficients for the more than one group of vertices.

The proposed methods may be used separately or combined in any order. The proposed methods may be used for arbitrary polygon mesh, but even though only a triangle mesh may have been used for demonstration of various embodiments. As noted above, it will be assumed that an input mesh may contain one or multiple instances, that a sub-mesh is a part of input mesh with an instance or multiple instance, and that multiple instances can be grouped to form a sub-mesh.

The techniques described above, can be implemented as computer software using computer-readable instructions and physically stored in one or more computer-readable media or by a specifically configured one or more hardware processors. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
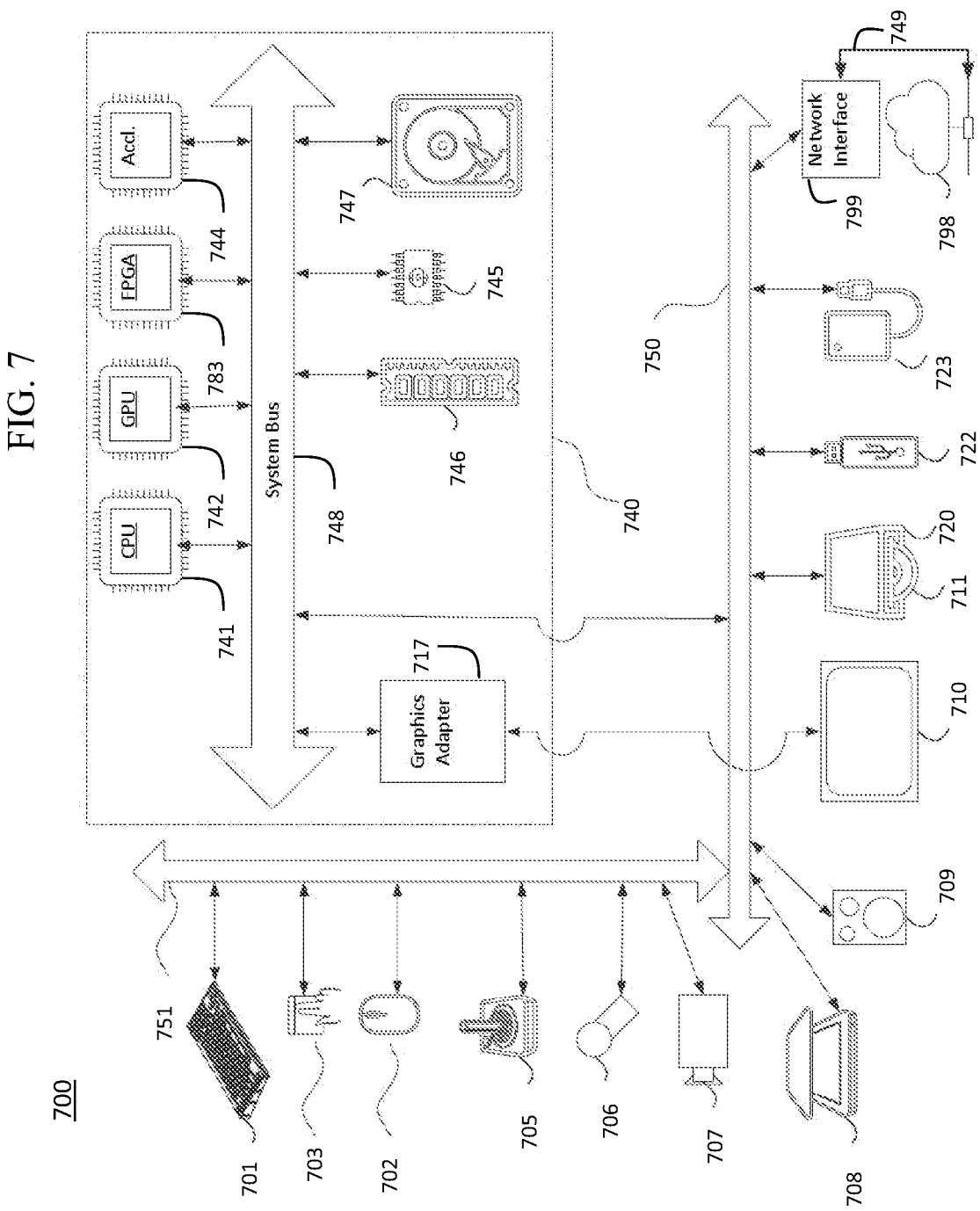
FIG. 7 is an exemplary diagram of a computer system suitable for implementing embodiments.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, joystick 705, microphone 706, scanner 708, camera 707.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD 711 or the like media, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface 799 to one or more communication networks 798. Networks 798 can for example be wireless, wireline, optical. Networks 798 can further be local, wide-area, metropolitan, vehicular and industrial, real-time, delay-tolerant, and so on. Examples of networks 798 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 798 commonly require external network interface adapters that attached to certain general-purpose data ports or peripheral buses (750 and 751) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks 798, computer system 700 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, a graphics adapter 717, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieval to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh compression, the method being performed by at least one processor, the method comprising:
    determining more than one vertices in an input mesh, the input mesh representing volumetric data of at least one three-dimensional (3D) visual content;
    grouping the more than one vertices in more than one group of vertices, wherein the grouping of a respective vertex in a respective group is based on a topological distance of the respective vertex;
    determining a set of filter coefficients for the more than one group of vertices; and
    signaling the more than one group of vertices and the set of filter coefficients including:
        signaling a binary flag for each group among the more than one group of vertices that indicates whether a filter coefficient for the respective group is enabled; and
        based on the binary flag for the respective group indicating that the filter coefficient is enabled, signaling one or more coefficients associated with the respective group.

2. The method of claim 1, wherein the grouping the respective vertex based on the topological distance comprises:
    determining neighboring vertices for the respective vertex, wherein neighboring vertices are vertices connected to the respective vertex by at least one edge; and
    grouping the respective vertex in a first group such that vertices in the first group are connected to a same number of vertices through edges.

3. The method of claim 2, wherein determining the neighboring vertices of the respective vertex comprises one of:

determining the neighboring vertices that are directly connected to the respective edge in the input mesh; or determining the neighboring vertices that are connected to the respective vertex a plurality of edges, the plurality of edges being less than or equal to a first threshold.

4. The method of claim 1, wherein determining the set of filter coefficients comprises:

determining the set of filter coefficients based on a first loss function and a first filter function, wherein the set of filter coefficients comprises one or more filter coefficients for each group among the more than one group of vertices, and wherein each coefficient in the set of filter coefficients is associated with one or more vertices in the more than one group of vertices.

5. The method of claim 4, wherein the first loss function comprises one of a point-to-point loss function, or point-to-plane loss function; and wherein the first filter function comprises one of a Laplacian filter or a Weiner filter.

6. The method of claim 1, wherein subsequent to determining the set of filter coefficients, the method further comprises:

disabling a first filter coefficient for a first group among the more than one group of vertices based on the first filter coefficient having a distortion higher than a distortion threshold.

7. The method of claim 1, wherein the method further comprises:

signaling a second flag that indicates whether a same first filter function is used to determine the set of filter coefficients for each group in the more than one group of vertices.

8. The method of claim 1, wherein the method further comprises:

signaling a third flag that indicates whether a same first loss function is used to determine the set of filter coefficients for each group in the more than one group of vertices.

9. An apparatus for adaptive geometry filter for mesh compression, the apparatus comprising:

at least one memory configured to store program code; and at least one processor configured to read the program code and operate as instructed by the program code, the program code comprising:

first determining code configured to cause the at least one processor to determine more than one vertices in an input mesh, the input mesh representing volumetric data of at least one three-dimensional (3D) visual content;

first grouping code configured to cause the at least one processor to group the more than one vertices in more than one group of vertices, wherein the grouping of a respective vertex in a respective group is based on a topological distance of the respective vertex;

second determining code configured to cause the at least one processor to determine a set of filter coefficients for the more than one group of vertices; and first signaling code configured to cause the at least one processor to signal the more than one group of vertices and the set of filter coefficients, the first signaling code further comprising:

second signaling code configured to cause the at least one processor to signal a binary flag for each group among the more than one group of vertices that indicates whether a filter coefficient for the respective group is enabled; and third signaling code configured to cause the at least one processor to signal, based on the binary flag for the respective group indicating that the filter coefficient is enabled, one or more coefficients associated with the respective group.

10. The apparatus of claim 9, wherein first grouping code further comprises:

third determining code configured to cause the at least one processor to determine neighboring vertices for the respective vertex, wherein neighboring vertices are vertices connected to the respective vertex by at least one edge; and second grouping code configured to cause the at least one processor to group the respective vertex in a first group such that vertices in the first group are connected to a same number of vertices through edges.

11. The apparatus of claim 10, wherein the third determining code further comprises one of:

fourth determining code configured to cause the at least one processor to determine the neighboring vertices that are directly connected to the respective edge in the input mesh; or fifth determining code configured to cause the at least one processor to determine the neighboring vertices that are connected to the respective vertex a plurality of edges, the plurality of edges being less than or equal to a first threshold.

12. The apparatus of claim 9, wherein the second determining code further comprises:

sixth determining code configured to cause the at least one processor to determine the set of filter coefficients based on a first loss function and a first filter function, wherein the set of filter coefficients comprises one or more filter coefficients for each group among the more than one group of vertices, and wherein each coefficient in the set of filter coefficients is associated with one or more vertices in the more than one group of vertices.

13. The apparatus of claim 9, wherein subsequent to determining the set of filter coefficients, the program code further comprises:

disabling code configured to cause the at least one processor to disable a first filter coefficient for a first group among the more than one group of vertices based on the first filter coefficient having a distortion higher than a distortion threshold.

14. The apparatus of claim 9, wherein the program code further comprises:

fourth signaling a second flag that indicates whether a same first filter function is used to determine the set of filter coefficients for each group in the more than one group of vertices.

15. The method of claim 9, wherein the program code further comprises:

fifth signaling code configured to cause the at least one processor to signal a third flag that indicates whether a same first loss function is used to determine the set of filter coefficients for each group in the more than one group of vertices.

16. The apparatus of claim 9, wherein the method further comprises:

sixth signaling code configured to cause the at least one processor to signal a third flag that indicates whether a same first loss function is used to determine the set of filter coefficients for each group in the more than one group of vertices.

17. A non-transitory computer-readable medium storing instructions, the instructions comprising: one or more instructions that, when executed by one or more processors of a device for geometry filter for mesh compression, cause the one or more processors to:

determine more than one vertices in an input mesh, the input mesh representing volumetric data of at least one three-dimensional (3D) visual content;

group the more than one vertices in more than one group of vertices, wherein the grouping of a respective vertex in a respective group is based on a topological distance of the respective vertex;

determine a set of filter coefficients for the more than one group of vertices; and signal the more than one group of vertices and the set of filter coefficients including:

signaling a binary flag for each group among the more than one group of vertices that indicates whether a filter coefficient for the respective group is enabled; and based on the binary flag for the respective group indicating that the filter coefficient is enabled, signaling one or more coefficients associated with the respective group.

18. The non-transitory computer-readable medium of claim 17, wherein the grouping the respective vertex based on the topological distance comprises:

determining neighboring vertices for the respective vertex, wherein neighboring vertices are vertices connected to the respective vertex by at least one edge; and grouping the respective vertex in a first group such that vertices in the first group are connected to a same number of vertices through edges.

* * * * *